United States Patent [19]

Borne et al.

[11] Patent Number: 4,526,435
[45] Date of Patent: Jul. 2, 1985

[54] CABLE CLAMPING DEVICE

[75] Inventors: André Borne, Villeurbanne; André Marmonier, Bron; Ariel Ruiz, Villeurbanne, all of France

[73] Assignee: CGEE Alsthom, France

[21] Appl. No.: 411,385

[22] Filed: Aug. 25, 1982

[30] Foreign Application Priority Data

Aug. 28, 1981 [FR] France ................ 81 16429

[51] Int. Cl.³ .................................. H01R 13/58
[52] U.S. Cl. ...................................... 339/103 C
[58] Field of Search ............... 339/103 C, 104, 107; 24/115 R, 136 R

[56] References Cited

U.S. PATENT DOCUMENTS

| | | | |
|---|---|---|---|
| 2,750,571 | 6/1956 | Schmier | 339/103 C |
| 3,617,615 | 11/1971 | Balzer | 339/107 |
| 3,629,803 | 12/1971 | Gluntz | 339/107 |
| 3,747,049 | 7/1973 | Cressman et al. | 339/107 |
| 4,030,800 | 6/1977 | Vidoni et al. | 339/107 |
| 4,076,365 | 2/1978 | Ross et al. | 339/107 |
| 4,108,527 | 8/1978 | Douty et al. | 339/107 |
| 4,243,288 | 1/1981 | Lucius et al. | 339/107 |
| 4,256,360 | 3/1981 | Debaigt | 339/107 |
| 4,280,746 | 7/1981 | Ignatowicz | 339/107 |
| 4,283,104 | 8/1981 | Pemberton | 339/107 |
| 4,284,317 | 8/1981 | Doyle | 339/107 |

Primary Examiner—Mickey Yu
Attorney, Agent, or Firm—Sughrue, Mion, Zinn, Macpeak, and Seas

[57] ABSTRACT

The device having a hermaphroditic assembly of two identical components (10, 10') for attaching the end (11) of a multiple conductor cable perpendicularly to an equipment (13) such as a junction block, connector, etc . . . Each component (10) has an arrangement (A) adapted for fixing it to the equipment and a cable clamping arrangement (B) coupled to the fixing arrangement by a semi-rigid link (C). The cable clamping arrangement comprises a bar (15) having at one end a notched tongue (20) and at the other end a locking aperture (18). After fitting the components (10) to the equipment, they are clamped together by means of a pincer movement (P) and the cable is then firmly attached to the equipment.

1 Claim, 4 Drawing Figures 4,526,435

CABLE CLAMPING DEVICE

BACKGROUND OF THE INVENTION

The present invention concerns a removable cable clamping device which may be attached without using screws. The individual conductors of a multiple conductor cable are spread out and individually connected to the terminals of an equipment such as a junction box, connector or similar. The spread ends are sometimes referred to as a "torch" and the clamping device as a "torch-holder". As the wires are all connected individually, it is important that the cable be maintained in a fixed position to prevent forces exerted on the cable causing excessive force to be exerted on certain connections and so that the wiring remains clear and orderly. The cable clamping device must be simple to fit with minimum tools, generally for reasons of accessibility. In accordance with the present invention, the use of metal and screws is avoided so as to eliminate the operation of tightening a screw, which can be time-consuming, and the jamming which may result from corrosion, for example.

SUMMARY OF THE INVENTION

The invention consists in a device for attaching a multiple conductor cable perpendicularly to an equipment to which the conductors of said cable are to be connected, comprising an hermaphroditic assembly of two identical components each of which has a section adapted for fixing it to said equipment and a cable clamping section, coupled to said fixing section by a semi-rigid link, said cable clamping section comprising a bar having on one side a rough surface for retaining said cable, at one end of a lengthwise notched tongue projecting from said one side and at its other end a co-operating locking aperture whereby said notched tongue of a first of said components may be locked into said locking aperture of the second of said components and said tongue of said second component locked into said locking aperture of said first component with said cable gripped between said rough surfaces of said components as a result of said tongues being forced into said locking apertures.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

The function of the cable clamping device 10, 10' in accordance with the invention is to attach and position the end of a cable 11 having multiple conductors 12a, 12b, etc . . . perpendicularly to an equipment 13, which may be a junction block, a connector or any other multiple connection component.

Figure 1:
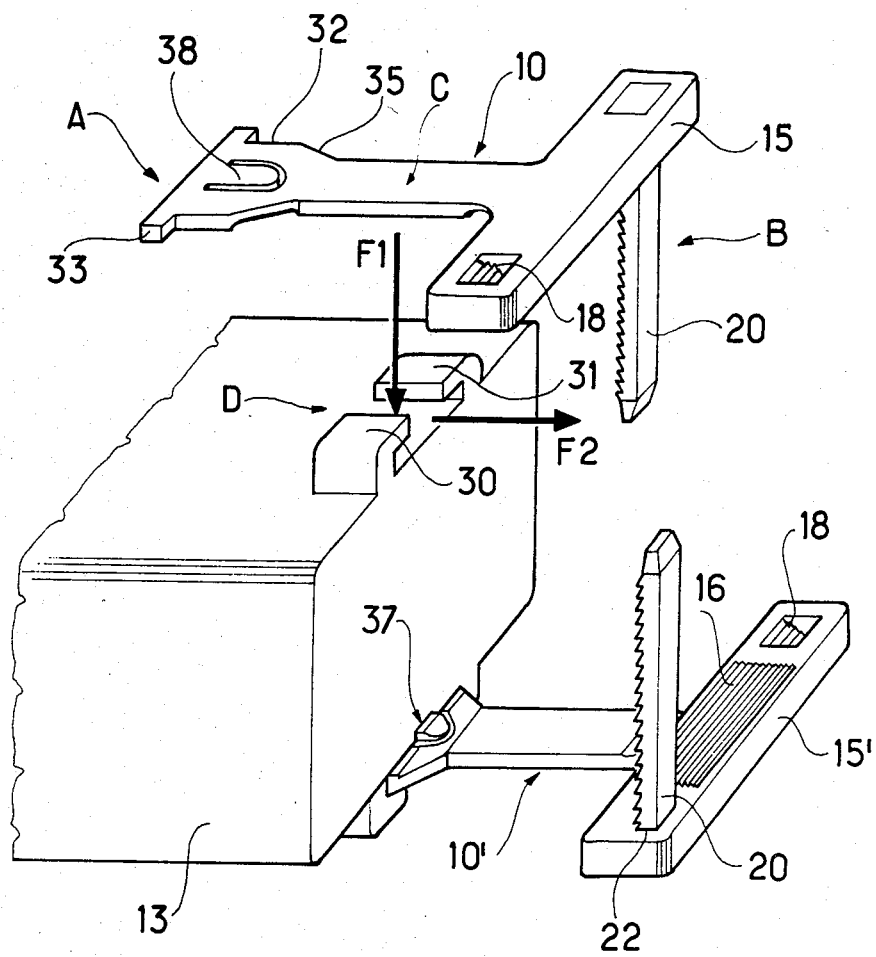
FIG. 1 is an overall view in perspective of a cable clamping device in accordance with the invention and in two parts, one part being shown fitted to an equipment and the other being shown spaced from its final position.

The cable clamping device of FIG. 1 comprises two identical T-shaped components 10, 10' preferably molded from a plastics material and disposed facing one another. Each component 10, 10' essentially comprises a section A for fixing it to equipment 13 and a clamping arrangement B coupled together by a semi-rigid link C.

Fixing section A may take various forms, including that described hereinafter in relation to FIGS. 1 and 2.

Clamping arrangement B essentially comprises a bar 15 disposed perpendicularly to a second bar constituting semi-rigid link C, bar 15 having centrally on one side a rough surface 16 adapted to come into contact with and retain the cable. The ends of bar 15 to either side of rough surface 16 are provided with complementary (hereinafter "hermaphroditic") means or section for fixing to bar 15 an identical component disposed so that the rough surfaces 16 of the two components are face to face and said hermaphroditic means co-operate with one another.

In accordance with the invention, one end of bar 15 of one component comprises a tongue 20 notched lengthwise in a manner known per se, projecting from the side with the rough surface 16, perpendicularly thereto, for example.

In accordance with the invention, the other end of each bar 15 comprises a locking aperture 18, of a type known per se, adapted to irreversibly retain a notched tongue 20 by virtue of one of the notches on the tongue when the tongue is forced into the opening.

The cable clamping device in accordance with the invention is assembled by inserting the notched tongue 20 of each of the two identical components into the locking aperture 18 of the other so that the rough surface 16 on each component faces that on the other component.

Figure 2:
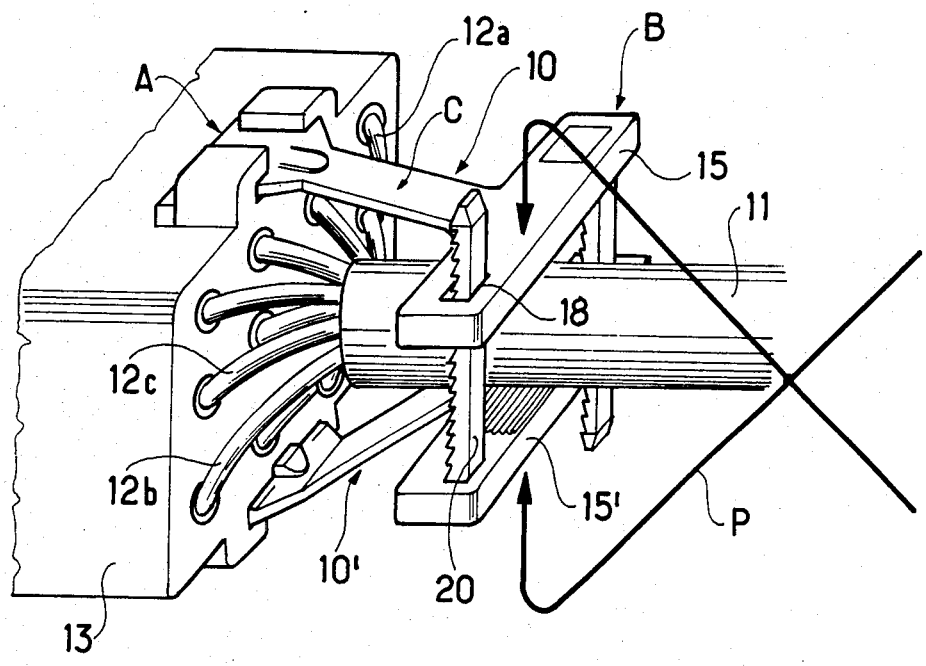
FIG. 2 shows the cable clamping device of FIG. 1 in its final position on a cable end.
Figure 3:
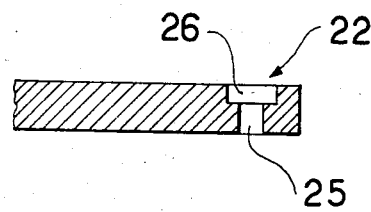
FIG. 3 is a partial view in cross-section of a portion of a variant.
Figure 4:
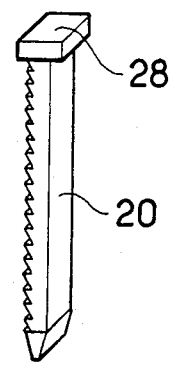
FIG. 4 is a perspective view of a separate part of the variant shown in FIG. 3.

In the embodiment shown in FIGS. 3 and 4, each notched tongue 20 is accomodated in an opening 25, the cross-section of which corresponds to that of tongue 20, with a widened portion 26 adapted to retain a widened head 28 of tongue 20. In the embodiment of FIGS. 1 and 2, these means are constituted by virtue of a unitary construction obtained either by mutual melting or by molding as a single piece from the outset. The advantage of the FIG. 1 embodiment is that component 10 and notched tongue 20 form a single part and so facilitate storage and supply. The FIGS. 3 and 4 embodiment offers the advantage of comprising two simple component parts, namely component 10 and tongue 20, obviously easy to distinguish from one another, to supply and to use separately and independently, without any possibility of confusion. Moreover, as the notched tongue is not inserted until the end of the operation, it does not represent an inconvenience during the assembly of the components and the working space is less congested.

Notched devices of the type represented by tongue 20 and locking aperture 18 are well-known per se and it is not necessary to describe them in further detail. Their essential feature is that bar 15 has at one end a locking aperture 18 and at the other end a tongue, attached by any appropriate means including forming the tongue integrally with the bar by molding them together as a single piece.

Fixing section A relates to a fixing member D on the equipment. In the embodiment shown in FIGS. 1 and 2, member D is in the form of a T-shaped slot defined by two lugs 30, 31. Fixing section A is in the form of a plane part comprising a widened portion 32 corresponding to the width of the T-shaped slot, and an even wider end area or portion 33 acting as a stop to limit displacement of component 10 in the slot, the width of which is the same as or slightly greater than the width of link C. To fit component 10 to equipment 13 part C is inserted between lugs 30 and 31 in the direction shown by arrow F1 until it bottoms in the slot, and component 10 is then pulled in the direction of arrow F2 so as to insert section 32 between lugs 30, 31 with section 33 butted up against the end surfaces of these lugs. In order to facilitate this operation, the section 35 linking part C to area 32 may have oblique edges. Area 32 may comprise a click tab 37 on a cut-out flexible lug 38 in the center of area 32.

When the two components 10, 10' have been attached to the equipment and the cable 11 fitted and conductors 12 attached, tongues 20 are fitted (if not an integral part of components 10, 10') and the two bars 15, 15' are clamped against one another by virtue of a pincer movement shown by arrows P, which forces tongues 20 into locking apertures 18 in which they remain locked. This terminates the operation, without further complication. The clamping of the cable prevents backward movement the cable clamp. Once fitted, the excess lengths of tongue may be cut off using wirecutters, to reduce the overall dimensions of the completed assembly. Bars 15, 15' form clamping flanges and are thicker, being able where necessary to resist the force of pliers and to transmit this force to the notched tongues with minimum transverse bending.

In the case of FIGS. 1 and 2, detaching the cable involves destroying the cable clamping device by cutting central part C or notched tongues 20. In the case of FIGS. 3 and 4 it is only necessary to cut through notched tongues 20, which are not integral with components 10 so that the latter are not destroyed. The semi-rigid link C preferably comprises a bar which is able to bend, by virtue of its small thickness, to permit the cable clamping device to adapt to equipment widths which may be different, within a limited range. On the other hand, the width of this bar is selected to avoid any bending permitting movement of the cable end in a plane parallel to the surface of the equipment to which the conductors are connected.

It will be understood that various changes in the details, materials, and arrangements of parts, which have been herein described and illustrated in order to explain the nature of the invention, may be made by those skilled in the art within the principle and scope of the invention as expressed in the appended claims.

It is claimed:

1. A device for attaching a multiple conductor cable perpendicularly to the end of equipment to which the conductors of said cable are to be connected, said device comprising a hermaphroditic assembly of two identical T-shaped components, each of which has a fixing section adapted for removable fixing to one of opposite sides of said equipment at said end, a semi-rigid link extending integrally from said fixing section and in line therewith, terminating beyond the end of said equipment to present for said components flexible links facing each other, and a cable clamping section integral with said semi-rigid link at the end remote from said fixing section and beyond the end of said equipment, said cable clamping section comprising a bar joined at its center to said link and being perpendicular to said link, said bar having on one side a rough surface for retaining said cable, a lengthwise notched tongue projecting perpendicularly from said one side of said bar at one end thereof and said bar, at its other end, bearing a cooperating locking aperture, whereby said notched tongue of a first of said components may be locked into said locking aperture of said second of said components and said tongue of said second component locked into said locking aperture of said first component, and wherein said semi-rigid links flex to allow said bars to move towards each other for gripping cables of various sizes between said rough surfaces of said component bars as a result of said tongues being forced into said locking apertures, with said semi-rigid links adapting to equipment of varying widths while permitting movement of the cable captured therebetween in a plane parallel to the end of the equipment at which the cable is gripped by said device, and wherein said fixing section is formed by a widened portion adapted to engage with a T-shaped slot formed by two lugs on said equipment, said semi-rigid link being adapted for insertion between said lugs and said fixing section terminating in a further laterally widened portion acting as a stop, and wherein said widened portion comprises a tab projecting toward said equipment, whereby said component is locked to said equipment.

* * * * *